United States Patent Office 3,324,453
Patented June 6, 1967

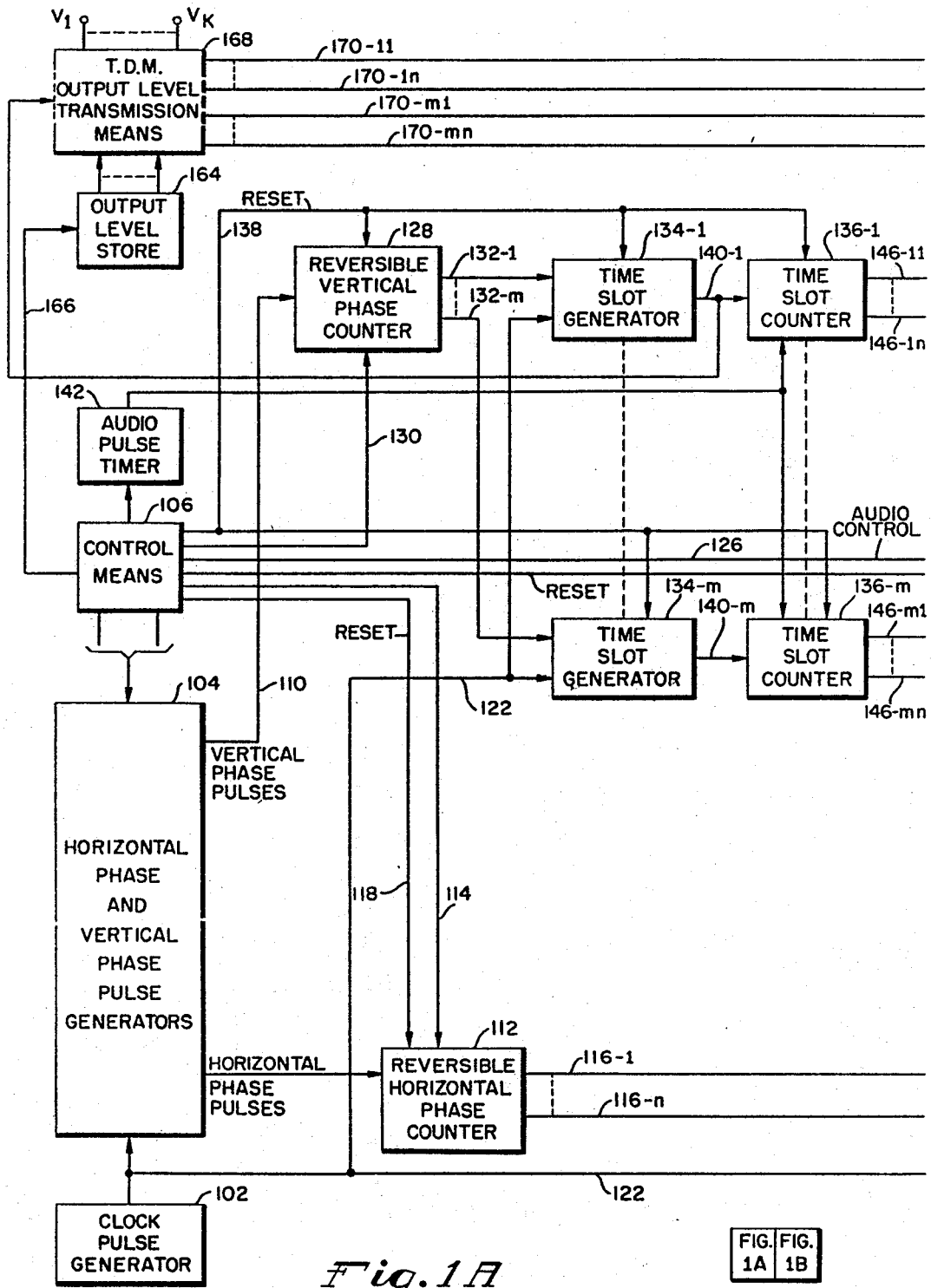

3,324,453
RECIRCULATING DELAY LINE PHASE CONTROL SYSTEM FOR USE IN PRODUCING A VARIABLE DIRECTION BEAM FROM A FIXED TRANSMITTING ARRAY
Barrie Brightman, Webster, N.Y., assignor to General Dynamics Corporation, Rochester, N.Y., a corporation of Delaware
Continuation of application Ser. No. 413,010, Nov. 23, 1964. This application Oct. 18, 1966, Ser. No. 587,625
13 Claims. (Cl. 340—5)

This is a continuation of application Ser. No. 413,010 filed Nov. 23, 1964, and now abandoned.

This invention relates to a phase control system and, more particularly, to such a system for producing a variable direction beam from a fixed transmitting array.

It is well known that a fixed transmitting array, such as an array composed of a plurality of stationary sonar transducers, may be utilized to transmit a directional beam of energy at any transmitting frequency, the direction of the beam being a function of the relative phase difference of the respective signals of the transmitting frequency applied to the respective transducing elements making up the array.

For instance, if signals having the same frequency and phase are applied to each transducer of a planar array of equally spaced transducers arranged in rows and columns, the array will transmit a broadside beam in a direction perpendicular to the planar array. On the other hand, if the phase of the signal applied to the respective transducers of each column is delayed by a time interval with respect to the phase of the signal applied to the respective transducers of the column immediately to its left which time interval is equal to the distance between adjacent transducers in each row divided by the velocity of propagation of the transmitted energy in the medium surrounding the transducers, an end-fire beam substantially parallel to the planar array will be propagated to the right. Similarly, if this time delay is more than zero, but is less than that necessary to produce an end-fire beam, a beam of energy will be propagated at some azimuth angle in the first quadrant which angle is a function of this time delay. In like manner, if the phase of the signal applied to the transducers of each column is delayed by an appropriate time interval with respect to the phase of the signal applied to the transducers of the column immediately to its right, a beam of energy will be propagated at some azimuth angle in the second quadrant. Just as the azimuth angle may be controlled by controlling the relative time delay between adjacent columns of a planar array, the elevation angle may be controlled by controlling the relative time delay between adjacent rows of a planar array.

The reason that a directional beam is produced is that wave energy transmitted by each of the transducers will algebraically add up to re-enforce each other in only a certain direction which depends solely on the positions of the transducers in the array and the relative phase difference existing between signals applied to adjacent transducers. In all other directions, the wave energy transmitted from each of the respective transducers of the array will algebraically add up to cancel each other.

Although in the above discussion it has been assumed that the fixed array is a planar array, this is not necessarily the case. It is possible by properly choosing the positions of the transducers in a non-linear, non-planar array, in a manner to be described in detail below, and by inserting pre-selected fixed phase delays in the signals applied to the transducers thereof to produce a virtual planar array which is displaced and/or rotated with respect to the actual array. Such a virtual plannar array at a predetermined angle with respect to an actual planar array may also be produced by inserting preselected fixed phase delays in the signals applied to the transducers thereof.

Since in most cases it is desirable to produce a directional beam of relatively narrow width, and a beam becomes narrower as the number of transducers in the transmitting array increases, it is often necessary to provide an array consisting of several hundred columns and rows of transducers in order to produce a beam of sufficient directivity. This requires that the minimum phase difference in the signals applied to the transducers of the various columns and rows be quite small, in the order of one degree or less.

It will be appreciated that with ordinary space division techniques it is quite difficult and expensive to provide each one of hundreds of transducers with a sinusoidal signal of a transmitting frequency which is accurately phased to a fraction of one degree for each selected one of a relatively large plurality of different available beam directions. This problem has limited the use of fixed transmitting arrays for producing a variable direction beam.

The present invention contemplates the utilization of time division multiplex techniques and, more particularly, the use of recirculating delay lines to produce the multiplicity of needed sinusoidal signals of different phases. Time division techniques may also be used to distribute the sinusoidal signals to the appropriate transducers for forming a beam in any one of a large plurality of different directions. Furthermore, for proper beam forming the relative levels of sinusoidal signals applied to the various transducers must be controlled. Time division multiplex techniques are also utilized for such level control.

It is therefore an object of the present invention to provide an improved phase control system for producing a variable direction beam from a fixed transmitting array.

It is a further object of the present invention to provide such a phase control system utilizing time division multiplex techniques.

It is a still further object of the present invention to provide such a time division multiplex phase control system incorporating recirculating delay lines.

These and other objects, features and advantages of the present invention will become more apparent from the following detailed description, taken together with the accompanying drawings, in which:

FIGS. 1A and 1B, when placed next to each other as shown in FIG. 1C, illustrate a block diagram of a preferred embodiment of the present invention;

Figure 1B:
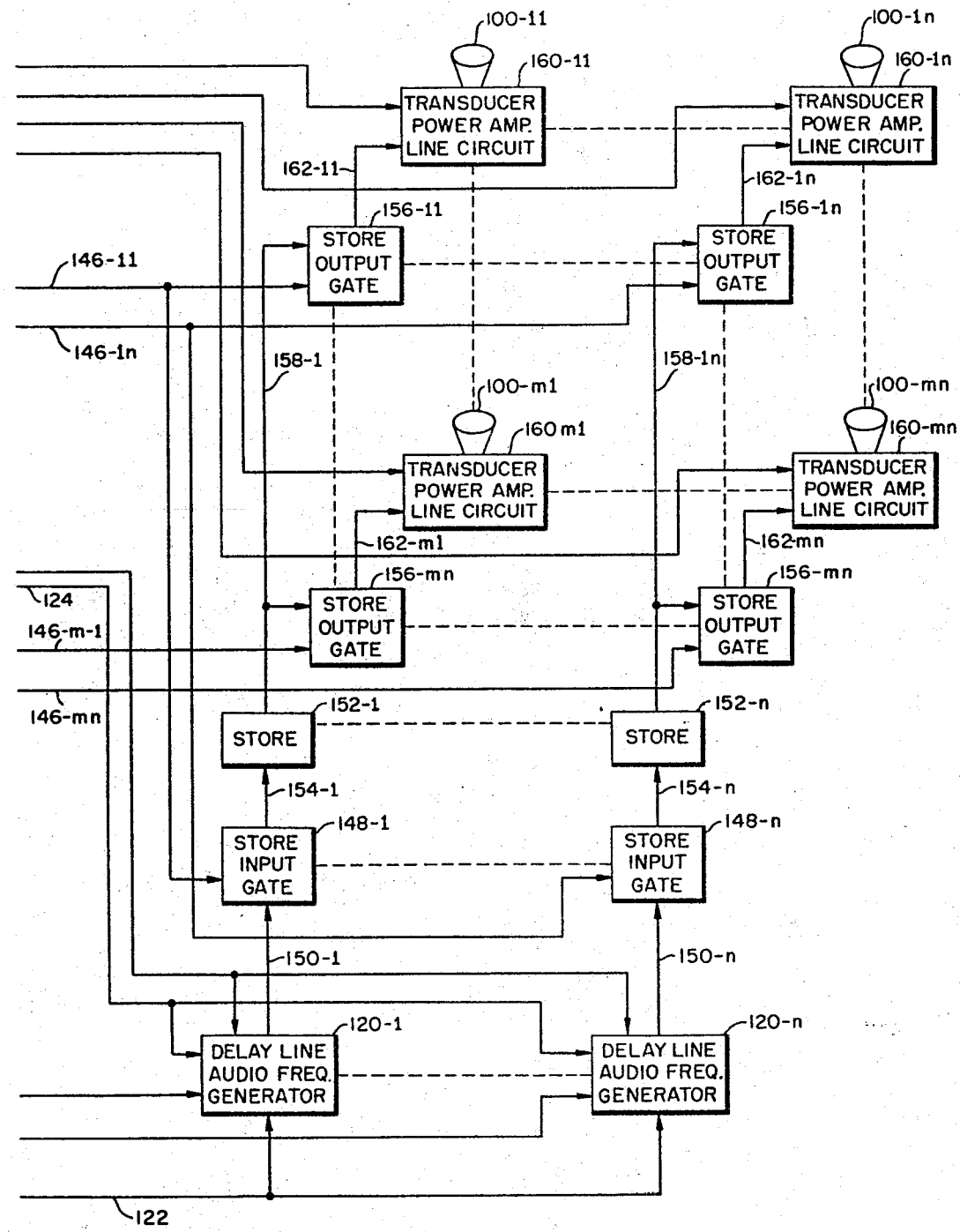

Referring to FIGS. 1A and 1B, there is diagrammatically shown a planar array of sonar transducers arranged in $m$ rows and $n$ columns, namely, transducers $100-ll \ldots 100-ln; \ldots; 100-ml \ldots 100-mn$. The spacing between adjacent columns of transducers is equal and the spacing between adjacent rows of transducers is equal, but the column spacing and the row spacing are not necessarily equal to each other.

The phase control system for producing a variable direction beam from this planar array of transducers is synchronized by clock pulses having a very high frequency, such as 15 mc., for instance, from clock pulse generator 102. Horizontal phase and vertical phase generators 104 to which clock pulses are applied may consist of a plurality of clock pulse frequency dividers or a plurality of clock pulse synchronized multivibrators. In any event, control means 106, which either manually and/or automatically supplies all control information, provides horizontal phase and vertical phase generators 104 with beam direction information as to the desired value of horizontal phase delay frequency and vertical phase delay frequency. This information is utilized to either control the tuning of the individual clock pulse synchronized multivibrators or the divisor of the individual frequency dividers, as the case may be, in block 104. In this manner variable frequency horizontal phase pulses are produced on conductor 108 which have a pulse repetition period which is an exact integral multiple of the clock pulse repetition period, and variable frequency vertical phase pulses are produced on conductor 110 which have a pulse repetition period which is an exact integral multiple of the clock pulse repetition period.

The horizontal phase pulses on conductor 108 are applied as an input to reversible horizontal phase counter 112. When a beam direction in the first quadrant is selected by control means 106, control means 106 applies a control signal to reversible horizontal phase counter 112 over conductor 114 which results in reversible horizontal phase counter 112 counting in a forward direction the horizontal phase pulses applied thereto over conductor 108. When a beam direction in the second quadrant is selected by control means 106, control means 106 applies a control signal to reversible horizontal phase counter 112 over conductor 114 which results in reversible horizontal phase counter 112 counting in a reverse direction the horizontal phase pulses applied thereto over conductor 108.

When reversible horizontal phase counter 112 is counting in a forward direction, an output pulse will be produced thereby in sequence on each individual one of conductors 116–l . . . 116–n in that order in response to each successive horizontal phase pulse applied thereto over conductor 108. When reversible horizontal phase counter 112 is counting in a reverse direction, an output pulse will be produced thereby in sequence on each individual one of conductors 116–n . . . 116–l in that order in response to each successive horizontal phase pulse applied thereto over conductor 108. Since the pulse repetition period of the horizontal phase pulses is variable, the time delay between the application of a pulse to successive ones of conductors 116–l . . . 116–n in a forward or reverse direction, as the case may be, is varied accordingly. In addition, control means 106, for a reason to be described below, applies a reset signal to counter 112 at certain times over conductor 118 which is effective in resetting counter 112.

The respective pulses on each individual one of conductors 116–l . . . 116–n are applied, as shown, as a first input to the corresponding one of delay line audio frequency generators 120–l . . . 120–n. Clock pulses from clock pulse generator 102 are applied in common as a second input to all of delay line audio frequency generators 120–l . . . 120–n, a reset signal from control means 106 is applied in common as a third input over conductor 124 to all of delay line audio frequency generators 120–l . . . 120–n, and an audio control signal from control means 106 is applied in common as a fourth input over conductor 126 to all of delay line audio frequency generators 120–l . . . 120–n.

Figure 2:
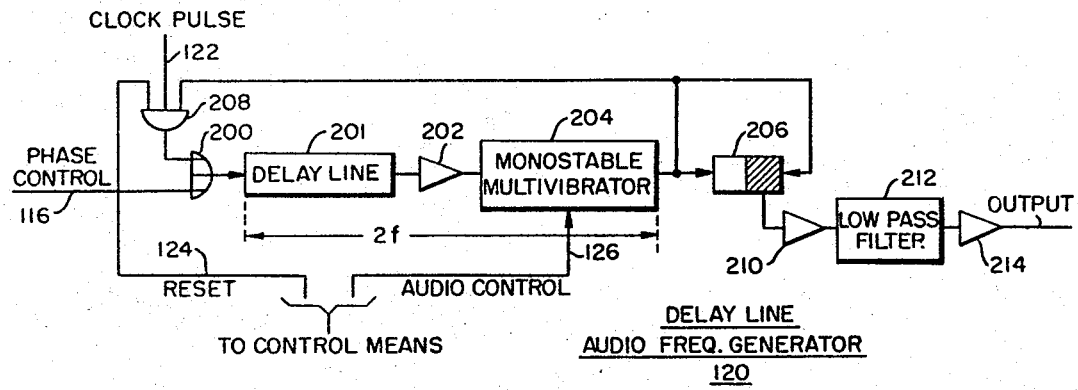
FIG. 2 is a block diagram showing the details of each delay line audio frequency generator utilized in the embodiment shown in FIGS. 1A and 1B.

The structure of any delay line audio frequency generators 120–l . . . 120–n, all of which are identical to each other, is shown in FIG. 2. Referring now to FIG. 2, the phase control pulse which arrives on the conductor 116 individual to any delay line audio frequency generator as the first input thereto is applied through OR gate 200 as the input to delay line 201. The pulse emerges from delay line 201 after a given delay which is determined by the length of delay line 201. After being amplified by amplifier 202, the pulse emerging from the output of delay line 201 is applied as an input to monostable multivibrator 204, which is set thereby. Monostable multivibrator 204, after being set, remains in its set condition for a given time interval which is a function of the magnitude of a bias voltage applied thereto. The audio control signal on conductor 126, which is applied as the fourth input to the delay line audio frequency generator, provides a bias voltage, under the control of control means 106, which has a magnitude which is a function of the desired audio frequency. At the end of this given time interval, monostable multivibrator 204 automatically resets, in a manner well known in the art of monostable multivibrators, and produces an output pulse therefrom which is coincident in time with the resetting thereof. The output pulse from monostable multivibrator 204 is applied as both a set and reset input to flip-flop 206 and is also applied as a first input to AND gate 208. AND gate 208 also receives as a second input thereto the clock pulses on conductor 122 which are applied as a second input to the delay line audio frequency generator, and also receives as a third input to AND gate 208 at the reset signal on conductor 124, which is applied as a third input to the delay line audio frequency generator from control means 106. The signal on conductor 124 is such as to normally enable AND gate 208, AND gate 208 only being disabled at those certain times when a reset signal is applied to conductor 124 under the control of control means 106.

Therefore, AND gate 208 normally produces as an output a reclocked pulse in response to an output pulse from monostable multivibrator 204. This reclocked pulse is applied as a recirculation input to delay line 201 through OR gate 200. Thus it will be seen that AND gate 208 forms part of the recirculation loop for the delay means which consist of delay line 201 in series with the variable delay produced by monostable multivibrator 204.

Thus, due to this recirculation, a series of time-spaced pulses having a pulse repetition period equal to the total delay provided by the sum of the individual delays due to delay line 201, monostable multivibrator 204 and any slight delay provided by amplifier 202 and the recirculation loop will be produced at the output of monostable multivibrator 204. Of course, this total delay may be varied in accordance with the audio control signal on conductor 126.

The odd occurring ones of these time-spaced pulses are effective in setting flip-flop 206, and the even occurring ones of these time-spaced pulses are effective in resetting flip-flop 206. Thus, flip-flop 206 will produce as an output a square wave having twice the period of the total delay provided by the recirculation delay means. The fundamental frequency of the square wave can therefore be varied merely by controlling the bias applied to monostable multivibrator 204 by the audio control signal on conductor 126. The control signal on conductor 126 may have only an adjustable D.C. value, in which case an audio square wave having a fixed fundamental frequency determined by this value will be produced by flip-flop 206. On the other hand, the control signal on conductor 126 may have an alternating frequency component with respect to an adjustable D.C. value, in which case an audio square wave having a fundamental frequency which is frequency-modulated may be produced.

It will be seen that the relative phase of the audio square wave produced by flip-flop 206 in response to the application of a phase control pulse on conductor 116 applied to any particular delay line audio frequency generator depends solely on the relative instant of time at which the phase control pulse on conductor 116 of that delay line audio frequency generator is applied. Further, the presence of a reset pulse on conductor 124 will disable AND gate 208 to thereby open the recirculation loop and erase the recirculating pulse and the audio square wave produced by flip-flop 206 which results therefrom.

The audio square wave from flip-flop 206, after being amplified by amplifier 210, is applied through low-pass filter 212 and amplifier 214 to the output of the delay line audio frequency generator. Low-pass filter 212 converts the applied audio square wave into a sinusoidal wave having a frequency and phase equal to the frequency and phase of the fundamental frequency of the applied audio square wave.

Referring back to FIGS. 1A and 1B, it will be seen that each of delay line audio frequency generators 120–1 . . . 120–n will produce a sinusoidal wave at its output. It will be further seen that the relative phase delay between respective sinusoidal wave outputs produced from adjacent ones of delay line audio frequency generators 120–1 . . . 120–n will be equal to the pulse repetition period of the horizontal phase pulses on conductor 108, which depend upon the azimuth of the desired beam direction. When, under the control of control means 106, it is desired to change the desired beam direction, or to compensate, under the control of control means 106, for yaw or pitch of the vessel on which the fixed transmitting array is mounted, it is necessary to change this relative phase delay between adjacent ones of delay line audio frequency generators 120–1 . . . 120–n. To accomplish this, control means 106 alters the pulse repetition period of the horizontal phase pulses on conductor 108, applies a reset signal to reversible horizontal phase counter 112 over conductor 118, and applies a reset pulse over conductor 126 as a third input to each of delay line audio frequency generators 120–1 . . . 120–n to cause the cancellation of the then circulating delay line pulses. This will result in new phase control pulses being applied by reversible horizontal phase counter 112 over conductors 116–1 . . . 116–n to the corresponding ones of delay line audio frequency generators 120–1 . . . 120–n to set up sinusoidal wave outputs therefrom having the new desired relative phase delay between adjacent sinusoidal wave outputs, which will be maintained until this relative phase delay is again changed in the same manner under the control of control means 106.

The vertical phase pulses on conductor 110, which have a pulse repetition period which, under the control of control means 106, depends on the elevation angle of the desired beam direction is applied as a first input to reversible horizontal phase counter 128. When a beam direction in the first quadrant is selected by control means 106, control means 106 applies a control signal to reversible vertical phase counter 128 over conductor 130 which results in reversible vertical phase counter 128 counting in a forward direction the vertical phase pulses applied thereto over conductor 110. When a beam direction in the fourth quadrant is selected by control means 106, control means 106 applies a control signal to reversible vertical phase counter 128 over conductor 130 which results in reversible vertical phase counter counting in a reverse direction the vetrical phase pulses applied thereto over conductor 110.

When reversible vertical phase counter 128 is counting in a forward direction, an output pulse will be produced thereby in sequence on each individual one of conductors 132–1 . . . 132–m in that order in response to each successive vertical phase pulse applied thereto over conductor 110. When reversible vertical phase counter 128 is counting a reverse direction, an output pulse will be produced thereby in sequence on each individual one of conductors 132–m . . . 132–l in that order in response to each successive vertical phase pulse applied thereto over conductor 110. Since the pulse repetition period of the vertical phase pulses is variable, the time delay between the application of a pulse to successive ones of conductors 132–l . . . 132–m in a forward or reverse direction, as the case may be, is varied accordingly. In addition, control means 106, for a reason to be described below, applies a reset signal to counter 128 as well as time slot generators 134–1 . . . 134–m and time slot counters 136–1 . . . 136–m at certain times over conductor 138 which is effective in resetting counter 128 as well as resetting time slot generators 134–1 . . . 134–m and time slot counters 136–1 . . . 136–m.

Each of time slot generators 134–1 . . . 134–m may include a multivibrator which is synchronized by clock pulses applied thereto over conductor 122 which when enabled produces time slot pulses at some fixed integral multiple of the clock pulse period, such as at a frequency of 1 mc. Each time slot generator further includes a bistable element which when set enables the multivibrator thereof and which when reset disables the multivibrator thereof. The reset signal applied to each of time slot generators 134–1 . . . 134–m is effective in resetting the bistable element thereof, while the vertical phase control pulses appearing on individual conductors 132–1 . . . 132–m is effective in setting the bistable element thereof.

As shown, each of time slot generators 134–1 . . . 134–m applies time slot pulses generated thereby as a first input to the corresponding one of time slot counters 136–1 . . . 136–m over the corresponding one of conductors 140–1 . . . 140–m.

Audio pulse timer 142, under the control of control means 106, applies an enabling signal in common as a second input to all of time slot counters 136–1 . . . 136–m over conductor 144 only during intermittent transmitting periods, each of which may be in the order of seconds. Each transmitting period, under the control of audio pulse timer 142, is followed by a receiving period, which also may be in the order of seconds, during which a disabling signal is applied in common as the second input to all of time slot counters 136–1 . . . 136–m over conductor 144.

Each of time slot counters 136–1 . . . 136–m includes a cyclic counter having a count capacity of n and AND gate means which is enabled only in response to the presence of an enabling signal from audio pulse timer 142 over conductor 144. The counter of each time slot counter 136–1 . . . 136–m is advanced in response to each time slot pulse from the corresponding one of time slot generators 134–1 . . . 134–m applied as a first input thereto over the corresponding one of the conductors 140–1 . . . 140–m. The AND gate means included in each of time slot counters 136–1 . . . 136–m only when enabled feeds the output of the counter thereto to the appropriate one of the output conductors thereof, e.g., 146–ll . . . 146–ln; . . . ; 146–ml . . . 146–mn, in accordance with the count manifested by the counter.

It will be seen that the counter of each time slot counter 136–1 . . . 136–m acts as a commutator or steering circuit for forwarding only during each transmitting period the time slot pulses applied thereto in sequence to each of the output conductors thereof, e.g., 146–ll . . . 146–ln; . . . ; 146–ml . . . 146–mn, to provide a repetitive time frame composed of n time slots.

The counters of all of time slot counters 136–1 . . . 136–m are simultaneously reset to a home position thereof in response to a reset signal on conductor 138. Since reversible vertical phase counter 128, when operating in a forward direction, initiates the operation of time slot generators 134–1 . . . 134–m in sequence with a time delay between adjacent time slot generators equal to one vertical phase pulse repetition period, it will be seen that although the time frame frequency of all of time slot counters 136–1 . . . 136–m is the same there will be a time delay between the beginning of the time frames of adjacent time slot counters 136–1 . . . 136–m which is just equal to one vertical phase pulse repetition period. For the same reason, when reversible vertical phase counter 128 is operating in a reverse direction, there will be a time delay between the beginning of the time frames of adjacent time slot counters 136–m . . . 136–l which is just equal to one vertical phase pulse repetition period.

The outputs of delay line audio frequency generators 120–1 . . . 120–n are applied as individual inputs to each corresponding one of normally closed store input gates 148–*l* . . . 148–*n* over conductors 150–*l* . . . 150–*n*. As shown, each of store input gates 148–*l* . . . 148–*n* are opened in sequence during successive time slots of each time frame produced by time slot counter 136–*l* over conductors 146–*ll* . . . 146–*ln*. However, the time slot pulses appearing at the output of any other single one of time slot counters 136–2 (not shown) . . . 136–*m*, rather than time slot counter 136–*l*, could just as easily be utilized to control the opening of store input gates 148–*l* . . . 148–*n*. The only thing that is important is that each store input gate 148–*l* . . . 148–*n* be squentially opened periodically during a different time slot of each successive time frame.

When any one of store input gates 148–*l* . . . 148–*n* is opened, a sample of the instantaneous amplitude of the sinusoidal wave appearing at the output of the corresponding one of delay line audio frequency generators 120–*l* . . . 120–*n*, applied over the corresponding one of conductors 150–*l* . . . 150–*n*, is forwarded to the corresponding one of stores 152–*l* . . . 152–*n* over the corresponding one of conductors 154–*l* . . . 154–*n*. Each of stores 152–*l* . . . 152–*n* registers the magntiude of the sample applied thereto for an entire time frame period until the next sample is applied thereto. Each of stores 152–*l* . . . 152–*n* may consist of a capacitance, which is charged by the sample applied thereto, feeding the input of a cathode follower or emitter follower. Since, as is well known in the art, a cathode follower or emitter follower has a very high input impedance, no appreciable discharge of the capacitance will take place during the single time frame period which exists between the application of successive samples thereto. Therefore, during this entire time frame period, the relatively low impedance output of the cathode follower or emitter follower will be maintained at a magnitude which is proportional to the magnitude of the sample then being stored by the capacitance of that store.

The output of each of stores 152–*l* . . . 152–*n* is applied in common as an input to all the store output gates corresponding with the column with which it is associated; i.e., the output of store 152–*l* is applied in common as an input to normally closed store output gates 156–*ll* . . . 156–*ml* over conductor 158–*l*; . . .; and the output of store 152–*n* is applied in common as an input to normally closed store output gates 156–*ln* . . . 156–*mn* over conductor 158–*n*.

The outputs from each of time slot counters 136–*l* . . . 136–*m* is effective in opening the store output gates corresponding with the row with which it is associated; i.e., the time slot pulses appearing on conductors 146–*ll* . . . 146–*ln* from time slot counter 136–*l* during each successive time frame sequentially open store output gates 156–*ll* . . . 156–*ln* during different time slots thereof; . . .; and the time slot pulses appearing on conductors 146–*ml* . . . 146–*mn* from time slot counter 136–*m* during each successive time frame sequentially open store output gates 156–*ml* . . . 156–*mn* during different time slots thereof.

As shown in FIGS. 1A and 1B, the output of each store output gate is applied as an input to the corresponding one of transducer, power amplifier, line circuits; i.e., the outputs of store output gates 156–*ll* . . . 156–*ln* are applied, respectively, as inputs to transducer, power amplifier, line circuits 160–*ll* . . . 160–*ln* over corresponding conductors 162–*ll* . . . 162–*ln*; . . .; and the outputs of store output gates 156–*ml* . . . 156–*mn* are applied, respectively, as inputs to transducer, power amplifier, line circuits 160–*ml* . . . 160–*mn* over corresponding conductors 162–*ml* . . . 162–*mn*.

Each transducer, power amplifier, line circuit includes a low-pass filter for reconstructing the sample into a sinusoidal wave having a phase which depends both on the phase of the sinuosidal wave emanating from that one of the delay line audio frequency generators 120–*l* . . . 120–*n* associated with the column with which it is associated and the vertical time delay experienced by that time slot counter corresponding to the row with which it is associated. This reconstructed sinusoidal wave is amplified by the power amplifier included in each transducer, power amplifier, line circuit and then is converted from electrical energy into sonic energy by the transducer included in each transducer, power amplifier, line circuit to cause the associated transducer to transmit a sonic wave having the same frequency and phase.

It will be seen that although in the embodiment shown in FIGS. 1A and 1B the delay line audio frequency generators 120–*l* . . . 120–*n* correspond with each column of transducers and the time slot counters 136–*l* . . . 136–*m* correspond with each row of transducers, it is possible to modify the embodiment shown in FIGS. 1A and 1B to provide a delay line audio frequency generator corresponding with each row of transducers and a time slot generator corresponding with each column of transducers. Of course, in this case, the output of reversible horizontal phase counter 112 would feed the time slot generators associated with each column and reversible vertical phase counter 128 would geed the audio delay line generators associated with each row.

In the manner that has been described up to now, signals having the desired audio frequency in proper relative phase in accordance with desired beam direction are applied to each of the transducer, power amplifier, line circuits.

However, it is also necessary to control the relative amplitude of each audio signal to be transmitted by each transducer in accordance with the selected beam direction. This may be accomplished in the same manner as described in detail in the copending application (D–3004) entitled, "Delay Counter Phase Control System for use in Producing a Variable Direction Beam from a Fixed Transmitting Array," by Uwe A. Pommerening, Ser. No. 412,956, filed Nov. 23, 1964, now abandoned, and assigned to the same assignee as the present invention. Briefly, this is accomplished, as shown in FIGS. 1A and 1B, by providing output level store 164, which may be a pre-programmed multichannel magnetic drum or core store, for instance, which obtains information as to the desired beam direction from control means 106 over conductor 166 which is synchronized by time slot pulses which may be obtained from any one of the time slot generators, such as time slot generator 134–*l*, for instance, and by providing conventional time division multiplex output level transmission means 168 (the details of which are shown in said copending application), which includes means for generating a repetitive time frame each including *n* time slots, from time slot pulses applied thereto from time slot generator 134–*l*. Output level store 164 in accordance with its program and the beam direction information received thereby provides, during each time slot of each time frame, a control pulse for opening some one of *k* normally closed level gates included in block 168, and more fully described in said copending application, associated with each row of transducers. Each level gate associated with any one row, when opened, applies a distinct one of *k* different voltage levels, V*l* . . . V*k*, to a common transmission highway (included within block 168 and more fully described in said copending application) corresponding to that row.

During each time frame the successive time slot pulses are effective in sequentially opening line gates individually associated with the transducer, power amplifier, line circuits of each row (which are included in block 168 and are more fully described in said copending application), so as to apply the selected ones of voltages V*l* . . . V*k* for each row as an input to the appropriate one of the transducer, power amplifier, line circuits of that row in accordance with conventional time division multiplex techniques, i.e., over conductors 170–*ll* . . . 170–*ln* associated with the top row; . . .; and over conductors 170–*ml* . . . 170–*mn* associated with the bottom row.

As more fully described in said copending application, each of the transducer, power amplifier, line circuits includes a rectifier for providing a D.C. voltage which has a magnitude proportional to that one of voltage $V_l \ldots V_k$ then being applied thereto. This D.C. voltage derived in each transducer, power amplifier, line circuit is utilized to control the gain of the power amplifier thereof, so that the amplitude of the sinusoidal wave being transmitted is controlled thereby.

Figure 3:
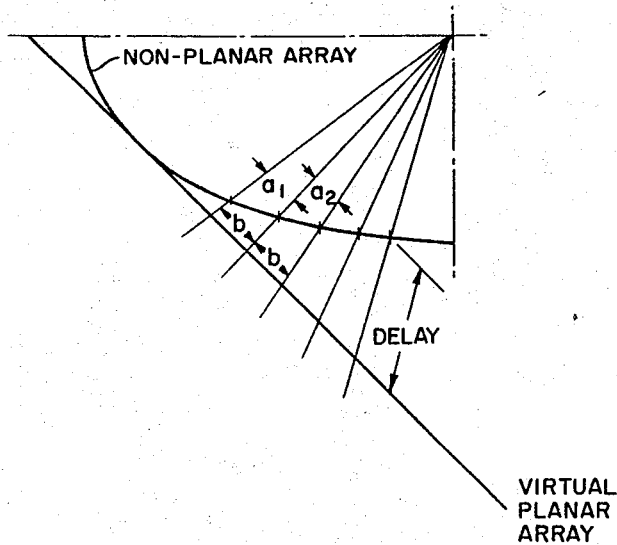
FIG. 3 illustrates the relationships of a non-planar array with a virtual planar array produced therefrom.

The basic preferred embodiment shown in FIGS. 1A and 1B is for use with a physically planar array. At times the actual physical array is not planar but has some other shape, such as elliptical, for instance. As shown in FIG. 3, a vertual planar array, wherein the effective distance "$b$" between adjacent transducers on the virtual planar array is equal, may be derived from an actual non-planar array by locating the physical transducers of the non-planar array at unequal distances "$a_1, a_2 \ldots$" from each other and providing an appropriate fixed delay for each transducer. More particularly, as shown in FIG. 3, the distances "$a_1, a_2 \ldots$" may be determined by choosing a line in accordance with the desired location of the virtual planar array, laying out equidistant points on this line, the distance between adjacent points being "$b$," drawing straight lines between these points and the origin of the non-planar array, and locating the transducers at the intersection of these straight lines and the non-planar array. The distance between the position of a transducer on the non-planar array and the point corresponding thereto on the virtual planar array manifests a fixed time delay which is equal to this distance divided by time velocity of sound in the surrounding medium.

Figure 4:
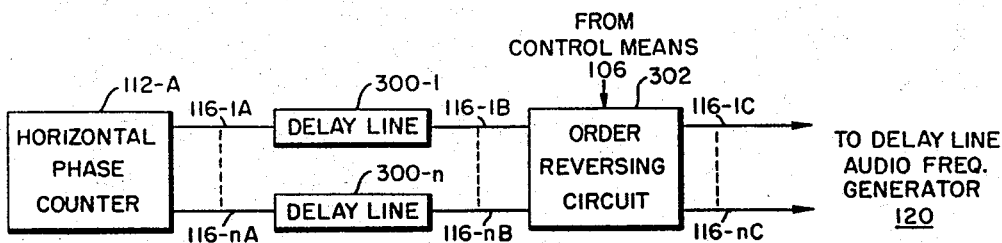
FIG. 4 illustrates a modification in the embodiments shown in FIGS. 1A and 1B utilized in producing a virtual planar array.

The embodiment shown in FIGS. 1A and 1B may be easily modified, as shown in FIG. 4, to provide this needed fixed delay for each transducer by substituting a non-reversible horizontal phase counter 112A for counter 112 shown in the embodiment of FIGS. 1A and 1B. Further, in FIG. 4, the output of the horizontal phase counter, rather than being applied directly to delay line audio frequency generators 120–*l* . . . 120–*n* over corresponding conductors 116–*l* . . . 116–*n*, is applied, as shown, as respective inputs to individual fixed delay lines 300–*l* . . . 300–*n*, each of which provides the needed fixed delay for each transducer, over corresponding conductors 116–*l*A . . . 116–*n*A. The output of the individual delay lines 300–*l* . . . 300–*n* are applied as inputs to order reversing circuit 302 over corresponding conductors 116–*l*B . . . 116–*n*B, and the individual outputs of order reversing circuit 302 are applied to the corresponding ones of delay line audio frequency generators 120–*l* . . . 120–*n* over the corresponding ones of conductors 116–*l*C . . . 116–*n*C. In addition, order reversing circuit 302 receives information from control means 106 as to whether the desired beam direction is in the first or second quadrant over conductor 114A.

When a beam direction in the first quadrant is selected by control means 106, order reversing circuit 302 couples conductors 116–*l*B . . . 116–*n*B to 116–*l*C . . . 116–*n*C, respectively. However, in the case where a beam direction in the second quadrant is selected by control means 106, order reversing circuit 302 couples conductors 116*l*B . . . 116–*n*B to conductors 116–*n*C . . . 116–*l*C, respectively. Thus, order reversing circuit 302 provides the same function as does the reversible horizontal phase counter 112 in the embodiment shown in FIGS. 1A and 1B, namely, providing a delay which increases from left to right or from right to left, as the case may be, for delay line audio frequency generators 120–*l* . . . 120–*n*. Each order reversing circuit merely consists of two sets of AND gates, either one of which is opened and the other one of which is closed under the control of control means 106.

It will be seen that if delay lines 300–*l* . . . 300–*n* are omitted, horizontal phase counter 112A plus order reversing circuit 302 may be substituted for reversible horizontal phase counter 112 in FIGS. 1A and 1B even when no virtual planar array is desired.

Even when the physical array is planar, under certain conditions, it may be desirable to use fixed delays to produce a virtual planar array at some fixed angle, such as 45°, with respect to the physical planar array. This is because steering steps are relatively crude toward en-fire with respect to steering steps closer to broadside of the array. For instance, with a 15 mc. clock, it is possible to obtain steering steps of approximately 0.2° when the angle of the planar array and the direction of the beam is between 30° and 45°; while if this angle is less than 10°, the smallest steering steps obtainable is greater than 0.5°. By providing a virtual array at 45° with respect to the physical array, a substantially end-fire beam makes an angle of close to 45° with respect to the virtual array, rather than the angle of close to 0° which it makes with respect to the physical array.

Although for illustrative purposes, only certain basic embodiments of the present invention have been shown. It is realized that it is within the skill of the art to add various subsidiary features, such as frequency modulation of the audio square wave by varying the frequency of the audio square wave under the control of control means 106, amplitude modulation of the audio wave by refinement of output level store 126 so that the output level is not only a function of beam direction but is a function of an applied modulation frequency, any of which may be desirable in a sophisticated sonar system. Therefore, it is intended that the present invention not be restricted to the specific embodiments disclosed, but that it be limited only by the true spirit and scope of the appended claims.

What is claimed is:

1. A phase control system for a two-dimensional fixed transmitting array composed of a plurality of individual transducers arranged in a first number of rows and a second number of columns; said system comprising a clock pulse source for generating clock pulses at a predetermined pulse repetition period; control pulse generating means synchronized by said clock pulses for generating first control pulses at a first preselected repetition period which is an integral multiple of said predetermined period and for generating second control pulses at a second preselected repetition period which is an integral multiple of said predetermined period; a group of delay line signal frequency generators equal in number to one of said first and second numbers; first control pulse steering counter means coupled between said control pulse generating means and said group of delay line signal frequency generators for sequentially applying successive first control pulses respectively as an input to each separate one of said group of delay line signal frequency generators; each of said group of delay line signal frequency generators comprising a bistable device for producing a first level potential when in its first stable condition and a second level when in its second stable condition and a recirculation loop, said loop comprising delay means including a delay line, input means to which said first control pulse is applied for applying an input pulse to said delay means, output means for extracting an output pulse from said delay means in response to an input pulse being applied thereto, and recirculation means coupling said output means to said input means for applying an output pulse as an input pulse to said delay means, said loop having a total loop delay equal to a given integral multiple of said predetermined period, said predetermined period multiplied by said given integral multiple being equal to one-half said signal frequency period, each of said group of delay line signal frequency generators further comprising means coupling said output means of the loop thereof to the input of said bistable device thereof for switching said bistable device thereof from its first to second stable condition in response to each odd output pulse applied thereto and from its second to its first stable condition in response to each even output pulse applied thereto, whereby the bistable device of each of said groups of delay line signal frequency generators produces a square wave output having a fundamental frequency equal to said signal frequency and a relative phase determined by the time of application of a first control pulse to that delay line signal frequency generator, and a low-pass filter coupled to said bistable device thereof for passing only said fundamental frequency to which said square wave output thereof is applied to convert said square wave output thereof into a sinusoidal wave; a group of disabled time slot means equal in number to the other of said first and second numbers, each of said time slot means when enabled producing at a given frequency at least twice said signal frequency repetitive time frames each consisting of a plurality of distinctive time slots equal in number to said one number; second control pulse steering counter means coupled between said control pulse generating means and said group of time slot means for sequentially applying successive second control pulses respectively as an input to each separate one of said group of time slot means to effect the enabling thereof in response thereto; an individual store means corresponding to each of said delay line signal frequency generators; sampling means controlled by one of said time slot means for sampling said sinusoidal wave of each of said delay line signal frequency generator once during each successive time of that time slot means and applying each sample to the corresponding store means; an individual line circuit including a low-pass filter for passing only said signal frequency coupled to each transducer; an individual group of normally closed gate means corresponding with each time slot means, each group of gate means including a member thereof corresponding to each delay line signal frequency generator, whereby a single gate means uniquely corresponds with each line circuit; means coupling the output of each store means to the input of that member of each group of gate means corresponding therewith; means for coupling the output of each gate means to the low-pass filter of the line circuit with which it uniquely corresponds; and means coupling each time slot means to the group of gate means corresponding thereto for sequentially opening each member thereof during the occurrence of a separate one of said distinctive time slots of successive time frames thereof, whereby each line circuit applies a sinusoidal wave having said signal frequency and a phase determined by said first and second preselected repetition periods to the transducer to which it is coupled.

2. The system defined in claim 1, further comprising control means for selecting said first preselected repetition period of said first control pulses and said second preselected repetition period of said second control pulses in accordance with the desired angular direction of a beam to be transmitted from said array.

3. The system defined in claim 2, including level determining means coupled to said control means for controlling the relative amplitudes of the respective sinusoidal waves applied to the respective transducers in accordance with said desired angular direction.

4. The system defined in claim 3, wherein said level determining means includes a plurality of separate points of different fixed potential, time division multiplex means including an output level store controlled by said control means for coupling said line circuits respectively to selected ones of said separate points in accordance with said desired angular direction, and power supply means within each line circuit responsive to the value of the fixed potential of the selected point coupled to that line circuit for controlling the amplitude of the sinusoidal wave emanating from that line circuit in accordance therewith.

5. The system defined in claim 2, wherein said first control pulse steering counter means is a reversible counter, and means coupling said first control pulse steering counter means to said control means for effecting counting in a forward direction when said desired angular direction lies in the first azimuth quadrant and for effecting counting in a reverse direction when said desired angular direction lies in the second azimuth quadrant.

6. The system defined in claim 2, wherein said second control pulse steering counter means is a reversible counter, and means coupling said second control pulse steering counter means to said control means for effecting counting in a forward direction when said angular direction lies in the first elevation quadrant and for effecting counting in a reverse direction when said desired angular direction lies in the fourth elevation quadrant.

7. The system defined in claim 1, wherein said array is a planar array with adjacent transducers in each row being equally spaced from each other and with adjacent transducers in each column being equally spaced from each other.

8. The system defined in claim 1, wherein said array is linear in at least one dimension, and including virtual plane producing means for producing a virtual plane displaced from said array composed of an individual point in said virtual plane corresponding to each transducer in said array wherein adjacent points in each row are equally spaced from each other and adjacent points in each column are equally spaced from each other, said virtual plane producing means comprising an indivdual delay line coupled to the input of each respective delay line signal frequency generator through which the first control pulse applied thereto is applied from said first control pulse steering counter means, each delay line corresponding with those transducers associated with the delay line signal frequency generator to which it is equal to the displacement of the points in said virtual plane corresponding to those transducers from those transducers divided by the velocity of propagation of transmitted energy in the medium surrounding said array.

9. The system defined in claim 8, wherein said array is non-planar, and wherein each transducer of said array is positioned at the intersection of said array with a line connecting the point of said virtual plane corresponding to that transducer with a common point on the other side of said array from said virtual plane.

10. The system defined in claim 1, wherein said recirculation loop of each delay line signal frequency generator further includes a monostable multivibrator in series with said delay line thereof, said monostable multivibrator producing an output pulse in response to an input pulse applied thereto after a time delay which is determined by the magnitude of bias potential applied to that monostable multivibrator, and control means coupled to the monostable multivibrator of each delay line signal frequency generator to control the magnitude of said bias potential to thereby control the signal frequency of the generated sinusoidal wave.

11. The system defined in claim 1, further including an audio pulse timer means coupled to said group of time slot means to render said time slots effective for opening said gate means solely intermittent transmitting time periods, the initiation and length of said transmitting time periods being controlled by said timer means.

12. A phase control system for a two-dimensional fixed transmitting array composed of a plurality of individual transducers arranged in a first number of rows and a second number of columns; said system comprising a clock pulse source for generating clock pulses at a predetermined pulse repetition period; control pulse generating means synchronized by said clock pulses for generating first control pulses at a first preselcted repetition period which is an integral multiple of said predetermined period and for generating second control pulses at a second preselected repetition period which is an integral multiple of said pretdetermined period; a group of delay line signal frequency generators equal in number to one of said first and second numbers; first control pulse steering counter means coupled between said control pulse generating means and said group of delay line signal frequency generators for sequentially applying successive first control pulses respectively as an input to each separate one of said group of delay line signal frequency generators; each of said group of delay line signal frequency generators comprising a bistable device for producing a first level potential when in its first stable condition and a second level potential when in its second stable condition and a recirculation loop, said loop comprising delay means including a delay line, input means to which said first control pulse is applied for applying an input pulse to said delay means, output means for extracting an output pulse from said delay means in response to an input pulse being applied thereto, and recirculation means coupling said output means to said input means for applying an output pulse as an input pulse to said delay means, said loop having a total loop delay equal to a given integral multiple of said predetermined period, said predetermined perod multipled by said given integral multiple being equal to one-half said signal frequency period, each of said group of delay line signal frequency generators further comprising means coupling said output means of the loop thereof to the input of said bistable device thereof for switching said bistable device thereof from its first to second stable condition in response to each odd output pulse applied thereto and from its second to its first stable condition in response to each even output pulse applied thereto whereby the bistable device of each said group of delay line signal frequency generators produces a square wave output having a fundamental frequency equal to said signal frequencies and a relative phase determined by the time of application of a first control pulse to that delay line signal frequency generator, a low pass filter coupled to said bistable device for passing only said funadmental frequency to convert said square wave output into a sinusoidal wave and time division multiplex means for coupling said sinusoidal wave to each of said transducers.

13. The invention as set forth in claim 12 wherein said time division multiplex means comprises a group of disabled time slot means equal in number to the other of said first and second numbers, each of said time slot means when enabled producing at a given frequency at least twice said signal frequency repetitive time frames each consisting of a plurality of distinctive time slots equal in number to said one number; second control pulse steering counter means coupled between said control pulse generating means and said group of time slot means for sequentially applying successive second control pulses respectively as an input to each separate one of said group of time slot means to effect the enabling thereof in response thereto; an individual store means corresponding to each of said delay line signal frequency generators; sampling means controlled by one of said time slot means for sampling said sinusoidal wave of each of said delay line signal frequency generator once during each successive time of that time slot means and applying each sample to the corresponding store means; an individual line circuit including a low-pass filter for passing only said signal frequency coupled to each transducer; an individual group of normally closed gate means corresponding with each time slot means, each group of gate means including a member thereof corresponding to each delay line signal frequency generator, whereby a single gate means uniquely corresponds with each line circuit; means coupling the output of each store means to the input of that member of each group of gate means corresponding therewith; means for coupling the output of each gate means to the low-pass filter of the line circuit with which it uniquely corresponds; and means coupling each time slot means to the group of gate means corresponding thereto for sequentially opening each member thereof during the occurrence of a separate one of said distinctive time slots of successive time frames thereof, whereby each line circuit applies a sinusoidal wave having said signal frequency and a phase detremined by said first and second preselected repetition periods to the transducer to which it is coupled.

No references cited.

RODNEY D. BENNETT, *Primary Examiner.*

R. A. FARLEY, *Assistant Examiner.*